(12) United States Patent
Pan

(10) Patent No.: US 9,673,671 B2
(45) Date of Patent: Jun. 6, 2017

(54) PERMANENT MAGNET ROTOR

(71) Applicant: Zhongshan Broad-Ocean Motor Manufacturing Co., Ltd., Zhongshan (CN)

(72) Inventor: Mingpan Pan, Zhongshan (CN)

(73) Assignee: ZHONGSHAN BROAD-OCEAN MOTOR MANUFACTURING CO., LTD., Zhongshan (CN)

( * ) Notice: Subject to any disclaimer, the term of this patent is extended or adjusted under 35 U.S.C. 154(b) by 199 days.

(21) Appl. No.: 14/691,603

(22) Filed: Apr. 21, 2015

(65) Prior Publication Data

US 2015/0229171 A1 Aug. 13, 2015

Related U.S. Application Data

(63) Continuation-in-part of application No. 13/292,054, filed on Nov. 8, 2011, now abandoned.

(30) Foreign Application Priority Data

Aug. 11, 2011 (CN) .................. 2011 2 0290991 U

(51) Int. Cl.
*H02K 1/27* (2006.01)
(52) U.S. Cl.
CPC ....... *H02K 1/2773* (2013.01); *H02K 2213/03* (2013.01)

(58) Field of Classification Search
CPC ... H02K 1/08; H02K 1/146; H02K 1/27; H02K 1/276; H02K 1/2766; H02K 1/2773; H02K 1/185; H02K 21/16; H02K 21/22; H02K 29/03
See application file for complete search history.

(56) References Cited

U.S. PATENT DOCUMENTS

| | | | | |
|---|---|---|---|---|
| 4,631,807 A * | 12/1986 | Kawada | ............... | H02K 1/2773 29/418 |
| 5,162,686 A * | 11/1992 | Royer | .................. | H02K 1/2773 310/156.59 |
| 5,841,212 A * | 11/1998 | Mita | ........................ | H02K 1/02 148/101 |
| 6,147,428 A * | 11/2000 | Takezawa | ............ | H02K 1/2766 310/156.57 |
| 6,707,206 B2 * | 3/2004 | Chang | .................... | H02K 1/278 310/156.01 |
| 6,847,149 B2 * | 1/2005 | De Filippis | ............ | H02K 29/03 310/216.008 |

(Continued)

*Primary Examiner* — Tran Nguyen
(74) *Attorney, Agent, or Firm* — Matthias Scholl P.C.; Matthias Scholl

(57) ABSTRACT

A permanent magnet rotor for a motor, the permanent magnet rotor including an iron core and a permanent magnet. The iron core includes an annular ring having a central axial bore and a plurality of magnetic induction blocks protruding outward from an outer side of the annular ring. Between two adjacent magnetic induction blocks form a radial recess for mounting the permanent magnets. The magnetic induction blocks at both sides of an opening of the radial recess protrude with a hook block. The section of an outer side surface of the magnetic induction blocks is a circular-arc line and the outer side surface employs a point with a distance deviating from the center of the central axial bore as a center of circle.

20 Claims, 5 Drawing Sheets

(56) References Cited

U.S. PATENT DOCUMENTS

| | | | |
|---|---|---|---|
| 6,891,299 B2* | 5/2005 | Coupart | H02K 11/25 310/152 |
| 6,911,756 B1* | 6/2005 | Chang | H02K 1/278 310/156.01 |
| 2003/0107290 A1* | 6/2003 | De Filippis | H02K 1/146 310/216.008 |
| 2009/0096308 A1* | 4/2009 | Staudenmann | H02K 1/2773 310/156.08 |
| 2010/0277028 A1* | 11/2010 | Alexander | H02K 1/2773 310/156.51 |
| 2012/0038237 A1* | 2/2012 | Li | H02K 1/146 310/156.45 |
| 2013/0038161 A1* | 2/2013 | Pan | H02K 1/2773 310/156.01 |
| 2013/0038162 A1* | 2/2013 | Pan | H02K 21/16 310/156.15 |

* cited by examiner

PERMANENT MAGNET ROTOR

CROSS-REFERENCE TO RELATED APPLICATIONS

This application is a continuation-in-part of, and claims domestic priority benefits to U.S. patent application Ser. No. 13/292,054, filed Nov. 8, 2011, now pending. Pursuant to 35 U.S.C. §119 and the Paris Convention Treaty, U.S. patent application Ser. No. 13/292,054, filed Nov. 8, 2011, now pending, claims the benefit of Chinese Patent Application No. 201120290991.3, filed Aug. 11, 2011. The contents of all of the aforementioned applications, including any intervening amendments thereto, are incorporated herein by reference in their entirety. Inquiries from the public to applicants or assignees concerning this document should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a permanent magnet rotor of a motor.

Description of the Related Art

As shown in FIG. 1, a conventional permanent magnet rotor of a motor includes an annular ring 2 having a central axial bore 1 and a plurality of magnetic induction blocks 3 protruding outward from an outer side of the annular ring 2. Between two adjacent magnetic induction blocks 3 form a recess 4 for mounting the permanent magnets 3. The magnetic induction blocks 3 at both sides of an opening of the recess 4 protrude with a hook block 31. An outer contour of the magnetic induction blocks 3 is formed by a circular-arc line and the circular-arc line employs the center of the central axial bore 1 as a center of circle. Such structure has the disadvantage of large magnetic leakage of the rotor core, high torque ripple, and distorted top waveform of counter-electromotive force.

SUMMARY OF THE INVENTION

In view of the above-described problems, it is one objective of the invention to provide a permanent magnet rotor of a motor that has a simple structure, low magnetic leakage and torque ripple, big counter-electromotive force constant, smooth waveform of counter-electromotive force, high service performance, and low loss.

To achieve the above objective, in accordance with one embodiment of the invention, there provided is a permanent magnet rotor of a motor comprising an iron core and a permanent magnet, wherein the iron core comprises an annular ring having a central axial bore and a plurality of magnetic induction blocks protruding outward from an outer side of the annular ring; a radial recess is formed by two opposing side surfaces of two adjacent magnetic induction blocks, respectively, and a portion of the outer side of the annular ring is surrounded by the two opposing side surfaces; the permanent magnet is mounted in the radial recess; the portion of the outer side of the annular ring forms an innermost end of the radial recess; the magnetic induction blocks at both sides of an opening of the radial recess protrude with a hook block; the section of an outer side surface of the magnetic induction blocks is an circular-arc line and the outer side surface employs a point with a distance deviating from the center of the central axial bore as a center of circle.

In a class of this embodiment, the distance deviating from the center of the central axial bore is 5-20 mm.

In a class of this embodiment, the maximum external diameter of the iron core is 80-90 mm and the number of the magnetic induction blocks is 10.

In a class of this embodiment, the ratio of the width of the permanent magnet to the maximum external diameter of the iron core is 0.09-0.11.

In a class of this embodiment, the ratio of the height of the permanent magnet to the maximum external diameter of the iron core is 0.28-0.3.

In a class of this embodiment, a distance between the two hook blocks arranged at the opening of the same radial recess is 3.5-5 mm.

In a class of this embodiment, a boss is arranged at the middle of the innermost end of the radial recess and protrudes toward the opening of the radial recess.

In a class of this embodiment, the boss comprises a top part and a bottom part, the top part being disposed on the bottom part. The top part is in a shape of a semi sphere, and the bottom part is in a substantially cylindrical shape. The permanent magnet is mounted on the top point of the top part and is spaced from the innermost end of the radial recess by the boss, and two cavities are formed between the permanent magnet and the innermost end of the radial recess.

In a class of this embodiment, each magnetic induction block is arranged with a through hole to facilitate mounting.

In a class of this embodiment, a line connecting the center of the central axial bore and the center of circle is a central boundary line of the circular-arc line of the outer side surface.

Advantages of the invention are summarized below:

1) the iron core comprises an annular ring having a central axial bore and a plurality of magnetic induction blocks protruding outward from outer side of the annular ring, between two adjacent magnetic induction blocks form a radial recess for mounting the permanent magnets, the magnetic induction blocks at both sides of the opening of the radial recess protrude with a hook block, and the section of the outer side surface of the magnetic induction blocks is an circular-arc line and the outer side employs a point with a distance deviating from the center of the central axial bore as the center of circle. Such structure is helpful to reduce magnetic leakage of the rotor core, lower cogging torque ripple, and achieve a big counter-electromotive force constant and smooth waveform of the counter-electromotive force. Therefore, the motor's performance has been improved and losses have been reduced;

2) the distance deviating from the center of the central axial bore is 5-20 mm, the maximum external diameter of the iron core is 80-90 mm and the number of the magnetic induction blocks is 10, the ratio of the width of the permanent magnet to the maximum external diameter of the iron core ranges is 0.09-0.11, and the ratio of the height of the permanent magnet to the maximum external diameter of the iron core is 0.28-0.3. This structural arrangement of the permanent magnet and the iron core ensures that substantially all of the magnetic field generated by the iron core is absorbed by the permanent magnet 5 and thus reduces magnetic leakage of the rotor core.

3) the distance between the two hook blocks arranged at the opening of the same radial recess is 3.5-5 mm and a boss having a semi spherical top part and a cylindrical bottom part is arranged at the middle of the innermost end of the radial recess, thus it can further reduce magnetic leakage of the rotor core.

DETAILED DESCRIPTION OF THE EMBODIMENTS

The invention is explained in further detail below with reference to the accompanying drawings and embodiments.

Figure 1:
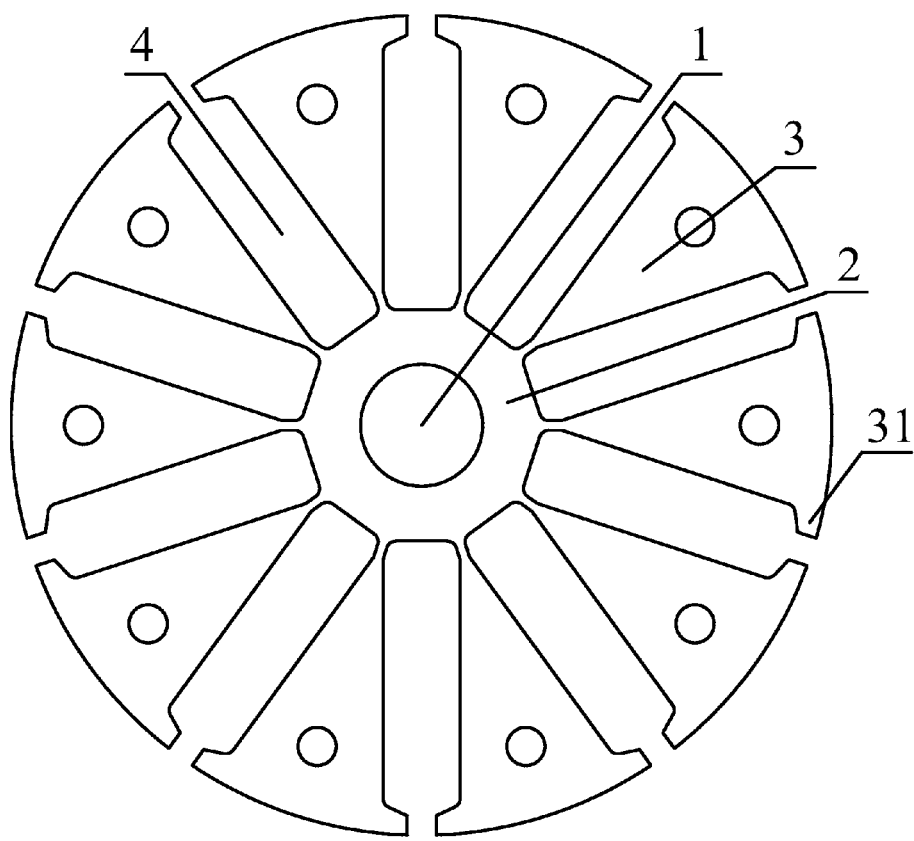
FIG. 1 is a schematic diagram of a permanent magnet rotor in the prior art.
Figure 2:
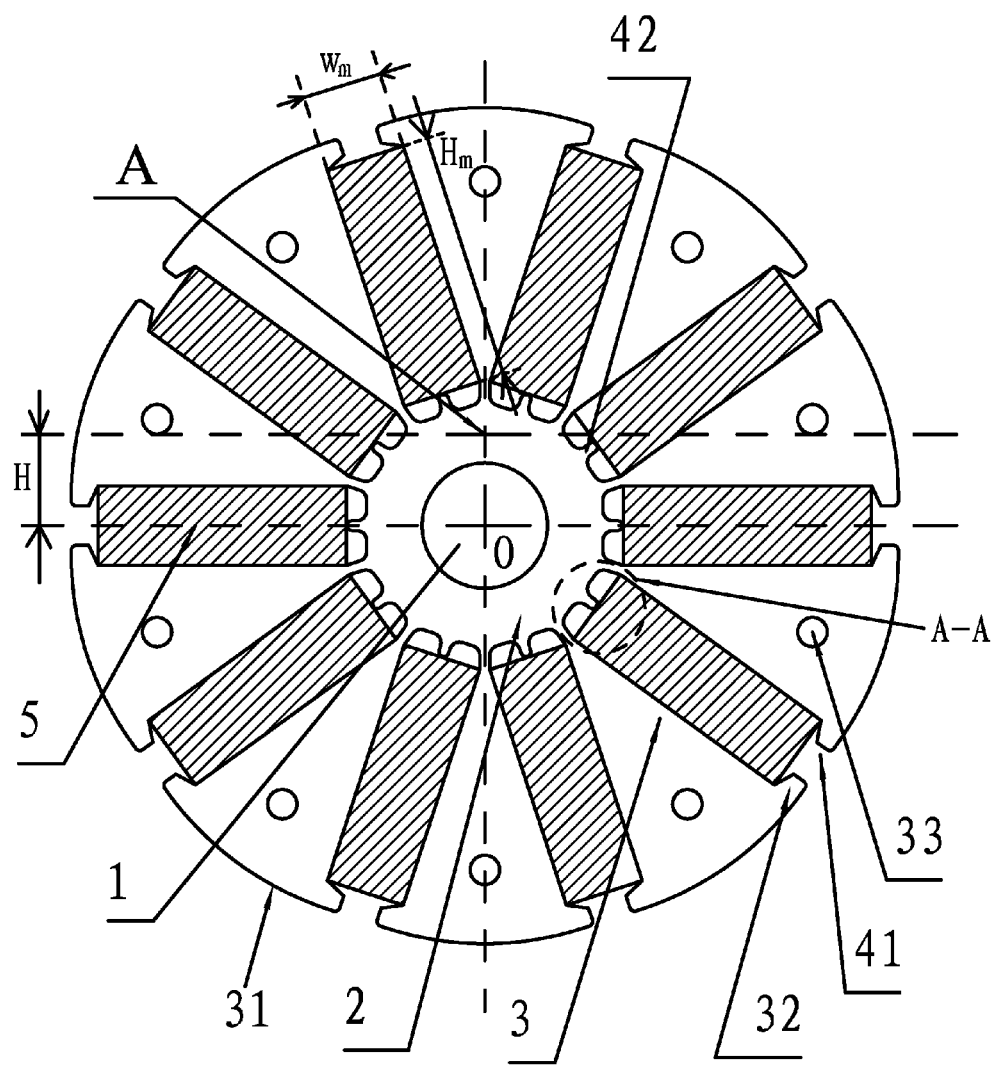
FIG. 2 is a schematic diagram of a permanent magnet rotor according to one embodiment of the invention.
Figure 3:
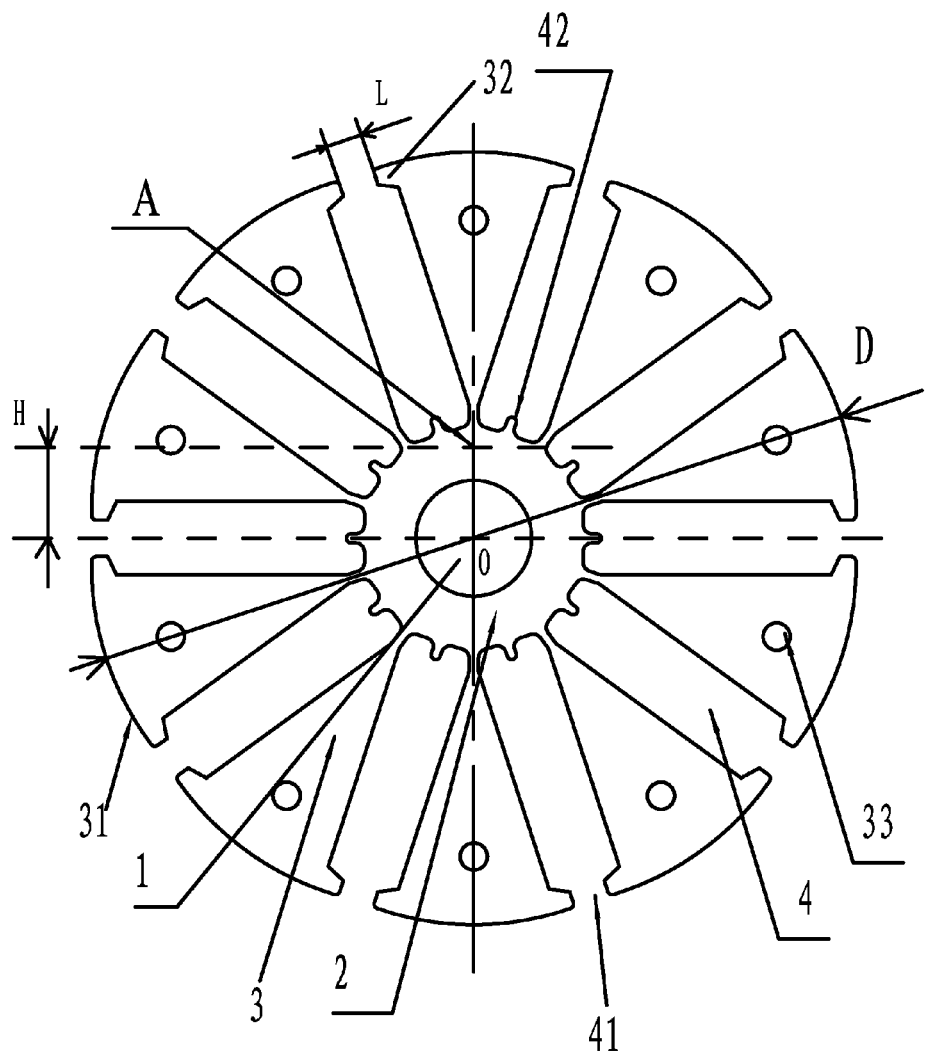
FIG. 3 is a schematic diagram of a iron core according to one embodiment of the invention.
Figure 4:
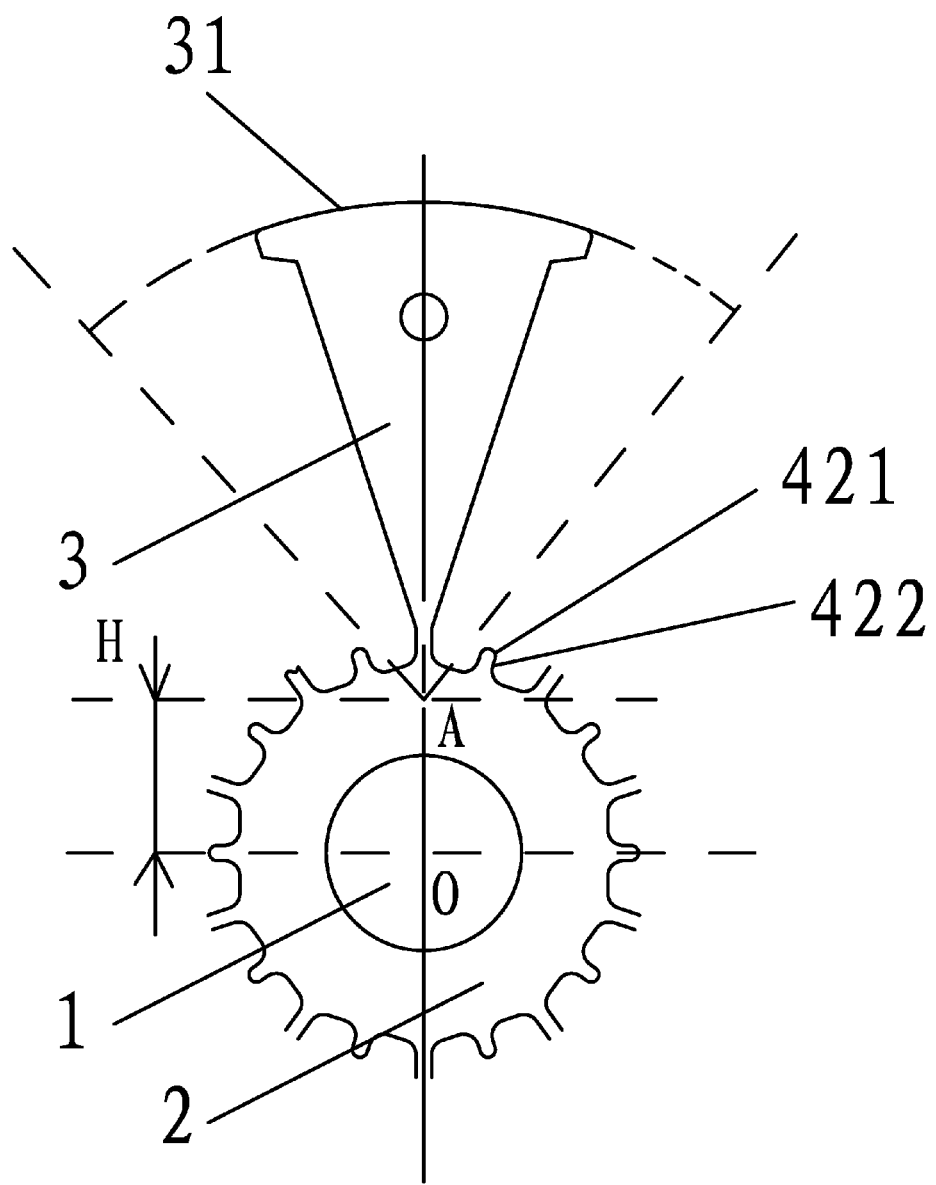
FIG. 4 is a design principle diagram of a permanent magnet rotor according to one embodiment of the invention.
Figure 5:
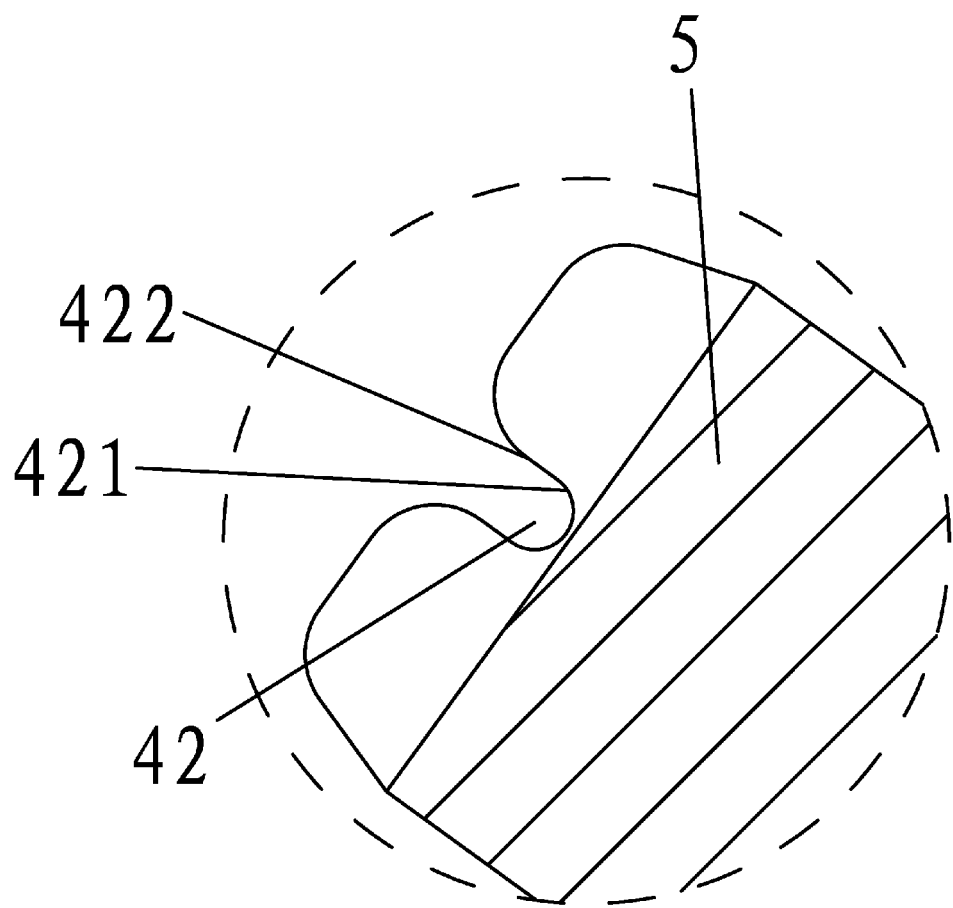
FIG. 5 is a partial enlarged view taken from line A-A of FIG. 2 according to one embodiment of the invention.

As shown in FIGS. 2, 3, 4, and 5, a permanent magnet rotor of a motor comprises an iron core and a permanent magnet 5. The iron core comprises an annular ring 2 having a central axial bore 1 and a plurality of magnetic induction blocks 3 protruding outward from an outer side of the annular ring 2. A radial recess 4 is formed by two opposing side surfaces of two adjacent magnetic induction blocks 3, respectively, and a portion of the outer side of the annular ring 2. The permanent magnet 5 is mounted in the radial recess 4, and the portion of the outer side of the annular ring 2 forms an innermost end of the radial recess 4. The magnetic induction blocks 3 at both sides of an opening 41 of the radial recess 4 protrude with a hook block 32. The section of the outer side surface 31 of the magnetic induction blocks 3 is an circular-arc line and the outer side surface 31 employs a point A with a distance H deviating from the center O of the central axial bore 1 as a center of circle. The distance H deviating from the center O of the central axial bore 1 is 5-20 mm. The maximum external diameter D of the iron core is 80-90 mm and the number of the magnetic induction blocks is 10, a distance L between the two hook blocks 32 arranged at the opening 41 of the same radial recess 4 is 3.5-5 mm. A line connecting the center O of the central axial bore 1 and the point A is a central boundary line of the circular-arc line of the outer side surface 31. Each magnetic induction block 3 is arranged with a through hole 33. A boss 42 is arranged at the middle of the innermost end of the radial recess 4 and protrudes toward the opening of the radial recess 4. The boss 42 comprises a top part 421 and a bottom part 422, the top part 421 being disposed on the bottom part 422. The top part 421 is in a shape of a semi sphere, and the bottom part 422 is in a substantially cylindrical shape. The permanent magnet 5 is mounted on the top point of the top part 421 and is spaced from the innermost end of the radial recess 4 by the boss 42, and two cavities are formed between the permanent magnet 5 and the innermost end of the radial recess 4. The permanent magnet 5 is only in contact with the top point of the top part 421; and except for the middle point of the permanent magnet 5 which is in contact with the boss 42, the permanent magnet 5 is spaced from the rotor core with substantially the same distance. Such structural arrangement of the boss 42 and the permanent magnet 5 ensures a substantially uniform magnetic insulation of the permanent magnet rotor and reduces magnetic leakage from the rotor core.

The ratio of the width $W_m$ of the permanent magnet 5 to the maximum external diameter D of the iron core ranges $W_m/D$ is 0.09-0.11. The ratio of the height $H_m$ of the permanent magnet 5 to the maximum external diameter D of the iron core $H_m/D$ is 0.28-0.3. This structural arrangement of the permanent magnet 5 and the iron core ensures that substantially all of the magnetic field generated by the iron core is absorbed by the permanent magnet 5. Thus, this structural arrangement reduces magnetic leakage of the rotor core, reduces cogging torque ripple generated by the iron core, achieve a larger counter-electromotive force constant, and smoothens the waveform of the counter-electromotive force.

In accordance with the invention, the section of the outer side surface 31 of the magnetic induction blocks 3 is an circular-arc line and the outer side surface 31 employs a point A with a distance H deviating from the center O of the central axial bore 1 as the center of circle. The distance H deviating from the center O of the central axial bore 1 is 5-20 mm. Such structure changes the shape of the outer side surface 31 of the magnetic induction blocks 3, thus it has a simple structure, low magnetic leakage and torque ripple, big counter-electromotive force constant, and smooth waveform of counter-electromotive force. Thus, the motor's performance has been improved and losses have been reduced. The permanent magnet rotor of the invention is mainly used for air-conditioned motors.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A permanent magnet rotor of a motor, the permanent magnet rotor comprising an iron core and a permanent magnet, wherein
   the iron core comprises an annular ring having a central axial bore and a plurality of magnetic induction blocks protruding outward from an outer side of the annular ring;
   a radial recess is formed by two opposing side surfaces of two adjacent magnetic induction blocks, respectively, and a portion of the outer side of the annular ring is surrounded by the two opposing side surfaces;
   the permanent magnet is mounted in the radial recess;
   the portion of the outer side of the annular ring forms an innermost end of the radial recess;
   the plurality of magnetic induction blocks at both sides of an opening of the radial recess protrude with a hook block;
   a section of an outer side surface of the plurality of magnetic induction blocks is a circular-arc line and the outer side surface employs a point with a distance deviating from the center of the central axial bore as a center of circle; and
   a ratio of a width of the permanent magnet to a maximum external diameter of the iron core is 0.09-0.11, wherein the width of the permanent magnet is in a circumferential direction of the rotor.

2. The permanent magnet rotor of claim 1, wherein a ratio of a height of the permanent magnet to the maximum external diameter of the iron core is 0.28-0.3, and wherein the height of the permanent magnet is in a radial direction of the rotor.

3. The permanent magnet rotor of claim 1, wherein the distance deviating from the center of the central axial bore is 5-20 mm.

4. The permanent magnet rotor of claim 1, wherein the maximum external diameter of the iron core is 80-90 mm and a number of the magnetic induction blocks is ten, and the permanent magnet comprises ten permanent magnets.

5. The permanent magnet rotor of claim 1, wherein a distance between two hook blocks arranged at the opening of the same radial recess is 3.5-5 mm.

6. The permanent magnet rotor of claim 2, wherein a distance between two hook blocks arranged at the opening of the same radial recess is 3.5-5 mm.

7. The permanent magnet rotor of claim 3, wherein a distance between two hook blocks arranged at the opening of the same radial recess is 3.5-5 mm.

8. The permanent magnet rotor of claim 4, wherein a distance between two hook blocks arranged at the opening of the same radial recess is 3.5-5 mm.

9. The permanent magnet rotor of claim 1, wherein
a boss is arranged at a middle of the innermost end of the radial recess and protrudes toward the opening of the radial recess;
the boss comprises a top part and a bottom part;
the top part is in a shape of a semi sphere and comprises a top point;
the bottom part is in a substantially cylindrical shape;
the top part is disposed on the bottom part; and
the permanent magnet is mounted on the top point and is spaced from the innermost end of the radial recess by the boss, wherein two cavities are formed between the permanent magnet and the innermost end of the radial recess.

10. The permanent magnet rotor of claim 2, wherein
a boss is arranged at a middle of the innermost end of the radial recess and protrudes toward the opening of the radial recess;
the boss comprises a top part and a bottom part;
the top part is in a shape of a semi sphere and comprises a top point;
the bottom part is in a substantially cylindrical shape;
the top part is disposed on the bottom part; and
the permanent magnet is mounted on the top point and is spaced from the innermost end of the radial recess by the boss, wherein two cavities are formed between the permanent magnet and the innermost end of the radial recess.

11. The permanent magnet rotor of claim 3, wherein
a boss is arranged at a middle of the innermost end of the radial recess and protrudes toward the opening of the radial recess;
the boss comprises a top part and a bottom part;
the top part is in a shape of a semi sphere and comprises a top point;
the bottom part is in a substantially cylindrical shape;
the top part is disposed on the bottom part; and
the permanent magnet is mounted on the top point and is spaced from the innermost end of the radial recess by the boss, wherein two cavities are formed between the permanent magnet and the innermost end of the radial recess.

12. The permanent magnet rotor of claim 4, wherein
a boss is arranged at a middle of the innermost end of the radial recess and protrudes toward the opening of the radial recess;
the boss comprises a top part and a bottom part;
the top part is in a shape of a semi sphere and comprises a top point;
the bottom part is in a substantially cylindrical shape;
the top part is disposed on the bottom part; and
the permanent magnet is mounted on the top point and is spaced from the innermost end of the radial recess by the boss, wherein two cavities are formed between the permanent magnet and the innermost end of the radial recess.

13. The permanent magnet rotor of claim 1, wherein each of the plurality of magnetic induction blocks is arranged with a through hole.

14. The permanent magnet rotor of claim 2, wherein each of the plurality of magnetic induction blocks is arranged with a through hole.

15. The permanent magnet rotor of claim 3, wherein each of the plurality of magnetic induction blocks is arranged with a through hole.

16. The permanent magnet rotor of claim 4, wherein each of the plurality of magnetic induction blocks is arranged with a through hole.

17. The permanent magnet rotor of claim 1, wherein a line connecting the center of the central axial bore and the center of circle is a central boundary line of the circular-arc line of the outer side surface.

18. The permanent magnet rotor of claim 2, wherein a line connecting the center of the central axial bore and the center of circle is a central boundary line of the circular-arc line of the outer side surface.

19. The permanent magnet rotor of claim 3, wherein a line connecting the center of the central axial bore and the center of circle is a central boundary line of the circular-arc line of the outer side surface.

20. The permanent magnet rotor of claim 4, wherein a line connecting the center of the central axial bore and the center of circle is a central boundary line of the circular-arc line of the outer side surface.

* * * * *